United States Patent [19]

Vecchiarelli

[11] 4,438,897

[45] Mar. 27, 1984

[54] HEADRAIL INSTALLATION BRACKET

[75] Inventor: Francis Vecchiarelli, River Edge, N.J.

[73] Assignee: Hunter Douglas International N.V., Rooi Catootje, Netherlands Antilles

[21] Appl. No.: 404,294

[22] Filed: Aug. 2, 1982

[51] Int. Cl.³ .......................... F16M 13/00; A47H 1/14

[52] U.S. Cl. .......................... 248/544; 248/251; 248/262

[58] Field of Search ............... 248/262, 544, 261, 265, 248/264, 267, 269, 263, 268, 270, 221–223; 160/178 B, 38, 39

[56] References Cited

U.S. PATENT DOCUMENTS 2,258,264 10/1941 Schultz .......................... 248/221.3
2,698,727 1/1955 Rutledge .......................... 248/264
3,278,145 10/1966 Leshuk .......................... 248/221.3 X
4,113,982 9/1978 Glaesel .......................... 248/221.3 X

FOREIGN PATENT DOCUMENTS 2300290 10/1976 France .......................... 248/221.3

*Primary Examiner*—J. Franklin Foss
*Attorney, Agent, or Firm*—Pennie & Edmonds

[57] ABSTRACT

A venetian blind headrail installation bracket including a body having first and second body portions. The first body portion includes an outwardly facing supporting member adapted to support a first edge of a U-shaped headrail. The second body portion has a slot-like opening therein. A spring member having an extended portion thereon is supported on one side by an abutment means on the first body portion and on an opposite side by the extended portion extending through the slot-like opening. The extended portion is adapted to support a second edge of the headrail.

6 Claims, 3 Drawing Figures

FIG. 1
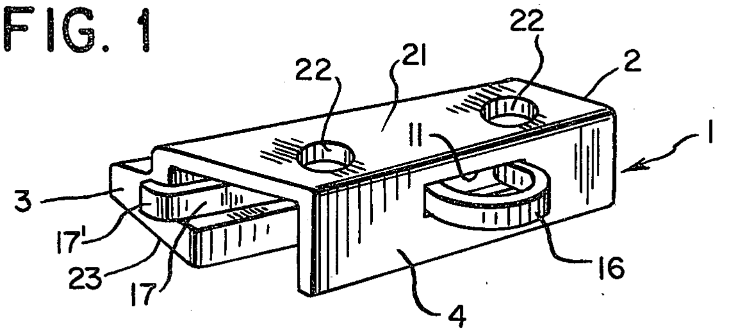
FIG. 2
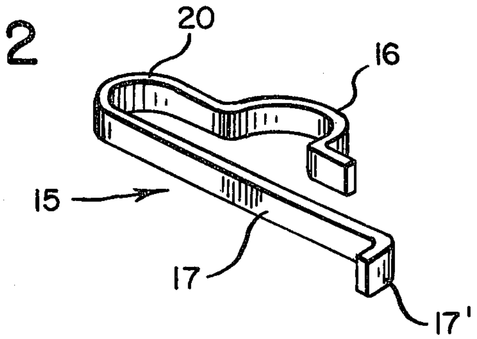
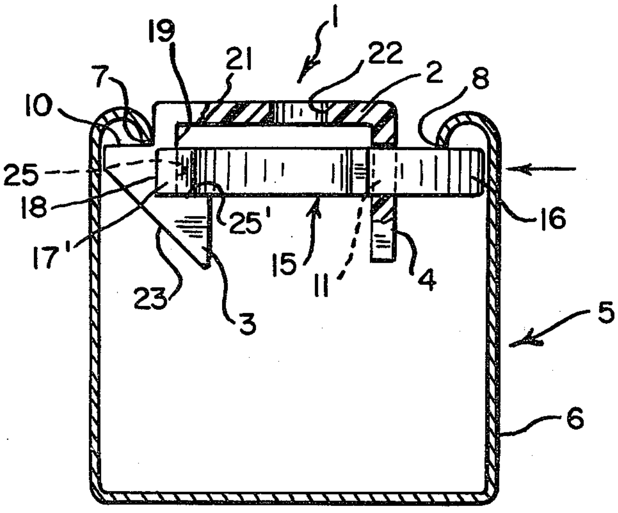
FIG. 3

HEADRAIL INSTALLATION BRACKET

TECHNICAL FIELD

This invention relates to a headrail installation bracket for mounting a venetian blind headrail to a frame member forming part of an opening.

BACKGROUND OF THE INVENTION

Venetian blind assemblies, are conventionally mounted in venetian blind headrails which are in turn fixed to framework forming part of a wall opening, as for example, a window. The headrails are usually fixed or mounted to the framework by way of headrail installation brackets which may take a variety of forms.

In some venetian blind designs, and in particularly those designs adapted for use between spaced sheets of glass, the spacing available for the headrail and installation brackets is quite small and complicates the installation of a headrail on a bracket. This is particularly true where the headrail is to be positioned in a deep pocket forming a confined space since it is difficult to reach around the headrail to actuate latching or unlatching portions of an associated installation bracket.

It is therefore an object of my invention to provide for a venetian blind headrail installation bracket which is adaptable for use in confined areas, as for example, for use in between the glass window units.

It is a further object of the invention to provide for a bracket that may be economically manufactured, that may easily be mounted with a conventionally shaped headrail, that may be easily secured to a frame member and which, when installed with a headrail, will be hidden by the headrail so as not to present an unslightly appearance.

DESCRIPTION OF THE INVENTION

Broadly a venetian blind installation bracket constructed according to the invention comprises a body having first and second body portions which extend parallel to the longitudinal axis of the headrail to be installed on the bracket. Mounting means are included on the body by which the body may be secured or fixed to a frame member forming part of a wall opening, as for example, a window opening. The first body portion has an outwardly facing support member adapted to support a first edge of a U-shaped headrail. The body also has an abutment means for supporting one side of a resilient spring member. The second body portion has a slot-like opening through which an extended portion of the spring member extends to support an opposite side of the spring member. The extended portion of the spring member which extends through the slot-like opening is adapted to support a second edge of the U-shaped headrail. The extended portion of the spring member is movable towards the abutment means against the force of the spring means.

A headrail is installed on the bracket by resting the second edge of the U-shaped headrail on the extended portion and moving the headrail so as to move the extended portion inwardly of the slot-like opening. The first edge of the U-shaped headrail may then be moved upwardly over the end of the outwardly facing support means on the first body portion. The spring means is then allowed to move the extended portion of the spring member and second edge of the headrail outwardly of the slot-like opening allowing the first edge of the headrail to slide over the outwardly facing supporting member at which point the headrail is installed on the bracket.

To detach the headrail from the bracket, the headrail is moved sideways against the force of the spring member until the first edge of the headrail clears the end of the outwardly facing supporting member after which the headrail may be rotated to drop the first edge below the outwardly facing supporting member.

The abutment means may be formed as a groove on an inner side of the first body portion such that a bottom of the groove may support a part of the spring member.

The body may be in the form of an inverted U with the first and second body portions each forming one leg of the U-shape and with the legs connected by a web section. Mounting means may be included in the web section in order to mount the bracket onto a frame member.

BRIEF DESCRIPTION OF THE DRAWINGS

FIG. 1 is a perspective view of an installation bracket constructed according to the invention;

FIG. 2 is a perspective view of a spring member forming part of the bracket of FIG. 1; and, FIG. 3 is a cross-sectional view of the bracket of FIG. 1 installed with a headrail.

DESCRIPTION OF THE PREFERRED MODE

Referring to FIGS. 1 and 3, there is shown a venetian blind headrail installation bracket 1 having a body 2 including a first body portion 3 and a second body portion 4 both of which extend parallel to the longitudinal axis of a headrail 5 with which the bracket is adapted to be installed.

Headrail 5 is conventional in shape and comprises a U-shaped channel 6 having a first inturned edge 7 and a second inturned edge 8.

The first body portion 3 has an outwardly facing supporting member 10 adapted, as shown in FIG. 3, to support the first edge 7 of the headrail 5. The second body portion 4 has a slot-like opening 11.

A spring member 15 in the form of a hairpin having an extended portion 16 is positioned on the body 2 so that one side 17 is supported by an abutment means 18 contained on an inner side 19 of the first body portion 3 and so that an opposite side 20 is supported by the extended portion bearing on the bottom of the slot-like opening 11.

As shown, the abutment means 18 may take the form of a groove 25 into which the side 17 of the spring is positioned so that the bottom of the groove forms an inwardly facing supporting member 25' to support the side 17. The end 21 of the spring may be turned outwardly to provide for further positioning of the spring in the body 2.

The body 2 may conveniently be in the form of an inverted U with the body portions 3 and 4 forming the legs of the U joined by a web section 21. Web section 21 in turn has mounting means 22 comprising holes through which screws or other fastening means may extend to secure the body 2 to a frame member (not shown) forming part of a wall opening.

The body portion 3 tapers outwardly from the free or bottom end thereof towards the outwardly facing supporting means 10 to form a guide surface 23. Guide surface 23 assists in guiding the edge 7 of the headrail towards engagement with the supporting means 10 on installation of the headrail with the bracket.

The headrail is installed with the bracket as follows. The end 8 of the headrail is initially placed on the extended portion 16 of the spring member. The headrail and extended portion are then moved in the direction of the arrow as shown in FIG. 3 against the force of the spring member towards the abutment means 18 until the edge 7 clears the end of the outwardly facing supporting member 10 at which point the headrail may be rotated clockwise or moved upwardly so that the edge 7 of the headrail is above the member 10. The headrail is then allowed to move under the force of the spring means until the edge 7 slides over the supporting member at which point the headrail will be installed on the bracket.

The headrail may also be mounted on the bracket by rotating it in a clockwise direction after the edge 8 has been positioned on the extended portion 16 so that the top of the inturned edge 7 slides on the guide surface 23. Since the surface 23 extends outwardly towards the end of the supporting member 10, it will force the headrail to move towards the left as shown in FIG. 3 against the force of the spring member 15 allowing the edge 7 to clear the end of the supporting member.

In order to remove or disengage the headrail from the bracket, the procedure is reversed. That is, the headrail is moved in the direction of the arrow in FIG. 3 against the force of the spring member until the edge 7 clears the end of the supporting member 10 after which the headrail is rotated counter-clockwise as shown in FIG. 3 to lower the edge below the end of the supporting surface 10.

The body 2 as shown has a configuration which is adapted to be conveniently molded from plastic material or formed from metal. While the body is shown as comprising a unitary piece, it could, of course, comprise separate parts.

As is apparent from FIG. 3, the bracket is substantially hidden by the headrail thus preventing any unsightly appearance.

As is further apparent from FIG. 3, the headrail may be easily installed on the bracket where the bracket is mounted within narrow confines, such as between glass panes in a window unit. The only spacing of a confined area needed beyond the width of the headrail itself is that to allow the edge 7 to move beyond the end of the outwardly facing supporting surface 10.

I claim:

1. A venetian blind headrail installation bracket for mounting of a U-shaped venetian blind headrail to a frame member, characterized in having a body including first and second body portions extending parallel to the longitudinal axis of the U-shaped headrail adapted to be mounted thereby, mounting means on said body adapted to mount said bracket to a frame member, an outwardly facing supporting member on said first body portion adapted to support a first edge of a U-shaped headrail, abutment means on said body, a slot-like opening in said second body portion, and a resilient spring member having an extended portion being supported on one side by said abutment means and on an opposite side by said extended portion extending through said opening outwardly of said body with said extended portion being adapted to support a second edge of said U-shaped headrail and said extended portion being movable towards said abutment means against the force of said spring means to allow disengagement of the first edge of a U-shaped headrail from said outwardly facing supporting member.

2. A venetian blind headrail installation bracket according to claim 2 further characterized in that said abutment means is formed by an inner side of said first body portion.

3. A venetian blind headrail installation bracket according to claim 2 further characterized in that said first body portion has an inwardly facing supporting member supporting said spring member.

4. A venetian blind headrail installation bracket according to claim 1 further characterized in that said body has a substantially inverted U-shape with said first and second body portions each forming a depending leg of the inverted U-shape and in that the legs are joined by a web section.

5. A venetian blind headrail installation bracket according to claim 4 further characterized in that said web section includes said mounting means.

6. A venetian blind headrail installation bracket according to claim 4 further characterized in that the leg formed by the first body portion tapers outwardly from a free end thereof towards said outwardly facing supporting member to provide a guide surface adapted to guide the first edge of a headrail towards engagment with said outwardly facing supporting member on installation of a headrail on said bracket.

* * * * *